(12) United States Patent
Yatsuri et al.

(10) Patent No.: US 10,220,783 B2
(45) Date of Patent: Mar. 5, 2019

(54) VEHICLE-MOUNTED STEREO CAMERA DEVICE AND METHOD FOR CORRECTING THE SAME

(71) Applicant: Panasonic Intellectual Property Management Co., Ltd., Osaka (JP)

(72) Inventors: Shigenori Yatsuri, Osaka (JP); Norikazu Yamamoto, Kyoto (JP); Mitsuru Kashihara, Osaka (JP); Yuichi Suzuki, Osaka (JP); Ken Ishida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 60 days.

(21) Appl. No.: 15/488,559

(22) Filed: Apr. 17, 2017

(65) Prior Publication Data

US 2017/0217370 A1     Aug. 3, 2017

Related U.S. Application Data

(63) Continuation of application No. PCT/JP2016/002919, filed on Jun. 17, 2016.

(30) Foreign Application Priority Data

Sep. 7, 2015 (JP) ................................ 2015-175287

(51) Int. Cl.
*H04N 7/00* (2011.01)
*B60R 1/00* (2006.01)
(Continued)

(52) U.S. Cl.
CPC ............ *B60R 1/00* (2013.01); *G06K 9/00791* (2013.01); *G06K 9/00805* (2013.01);
(Continued)

(58) Field of Classification Search
USPC .......................... 348/118, 120, 61, 42, 48, 51
See application file for complete search history.

(56) References Cited

U.S. PATENT DOCUMENTS

| 2007/0058049 A1* | 3/2007 | Kawahara | H04N 5/225 |
| | | | 348/218.1 |
| 2007/0165910 A1* | 7/2007 | Nagaoka | B60W 40/04 |
| | | | 382/104 |

(Continued)

FOREIGN PATENT DOCUMENTS

JP     2001-233139     8/2001

OTHER PUBLICATIONS

International Search Report of PCT application No. PCT/JP2016/002919 dated Aug. 30, 2016.

*Primary Examiner* — Daquan Zhao
(74) *Attorney, Agent, or Firm* — Renner Otto Boisselle & Sklar, LLP

(57) ABSTRACT

A vehicle-mounted stereo camera device that achieves high-precision distance detection is provided, including a left camera and a right camera disposed to cause visual fields to overlap each other, a first enclosure and a second enclosure that enclose the left camera and the right camera and have portions within the visual fields of the left camera and the right camera, respectively, and a stereo processor that calculates a distance to a body outside the vehicle based on images captured by the left camera and the right camera and on positions of the left camera and the right camera on the vehicle. The stereo processor detects displacement amounts of the left camera and the right camera based on amounts of change in positions of the first enclosure and the second enclosure within the visual fields of the left camera and the right camera, and changes a cutout position in the images captured by the left camera and the right camera.

4 Claims, 6 Drawing Sheets

(51) Int. Cl.

| | |
|---|---|
| *H04N 13/246* | (2018.01) |
| *G06T 7/70* | (2017.01) |
| *G06K 9/00* | (2006.01) |
| *G07C 5/00* | (2006.01) |
| *G06K 9/20* | (2006.01) |
| *H04N 13/239* | (2018.01) |
| *H04N 13/00* | (2018.01) |
| *G07C 5/08* | (2006.01) |

(52) U.S. Cl.
CPC ............... *G06K 9/209* (2013.01); *G06T 7/70* (2017.01); *G07C 5/006* (2013.01); *H04N 13/239* (2018.05); *H04N 13/246* (2018.05); *B60K 2350/106* (2013.01); *B60K 2350/2013* (2013.01); *B60R 2300/105* (2013.01); *B60R 2300/107* (2013.01); *B60R 2300/303* (2013.01); *B60R 2300/40* (2013.01); *G07C 5/0866* (2013.01); *H04N 2013/0081* (2013.01)

(56) References Cited

U.S. PATENT DOCUMENTS

2008/0143835 A1* 6/2008 Abe ..................... B60R 1/00
348/148
2017/0263014 A1* 9/2017 Kuznetsov ............. G01C 21/34

\* cited by examiner

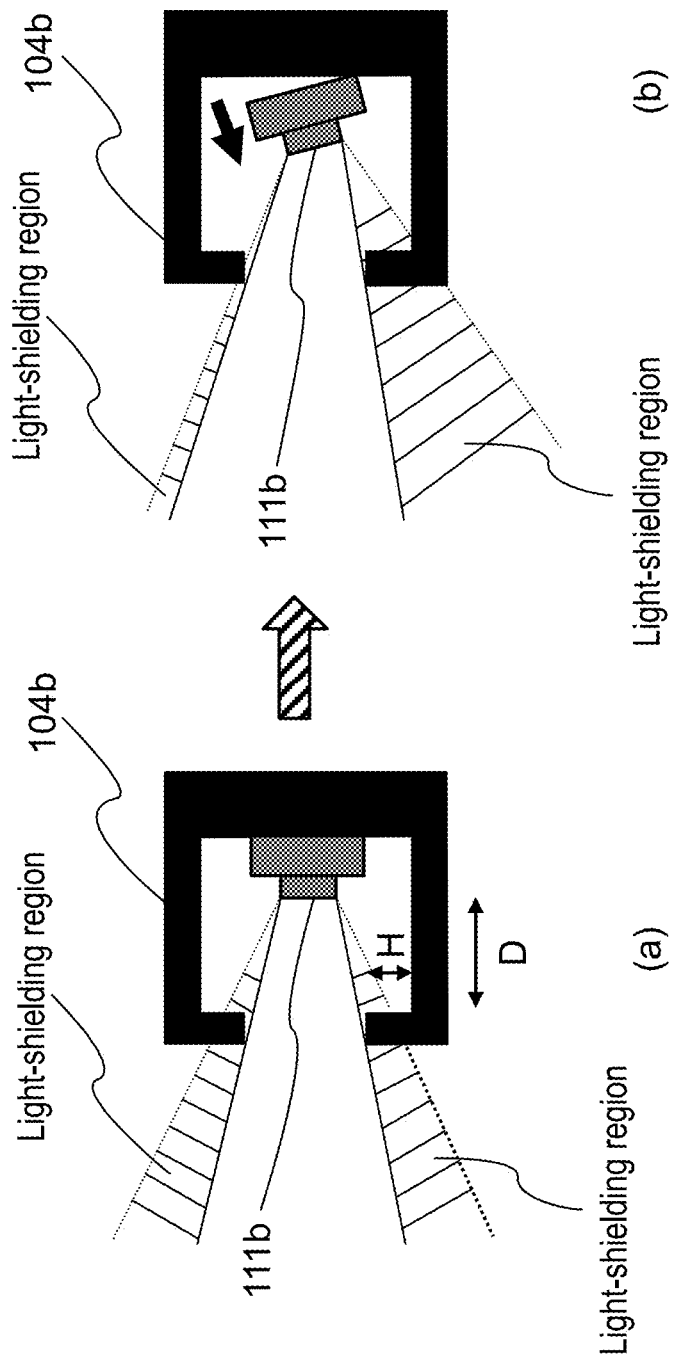

VEHICLE-MOUNTED STEREO CAMERA DEVICE AND METHOD FOR CORRECTING THE SAME

BACKGROUND

1. Technical Field

The present disclosure relates to a vehicle-mounted stereo camera device.

2. Description of the Related Art

Unexamined Japanese Patent Publication No. 2001-233139 discloses a vehicle-mounted stereo camera device having a function to adjust a positional displacement. The vehicle-mounted stereo camera device described in Unexamined Japanese Patent Publication No. 2001-233139 adjusts the positional displacement of a stereo camera based on an image obtained by capturing a fender marker.

SUMMARY

The vehicle-mounted stereo camera device according to the present disclosure includes: a first image capturing unit and a second image capturing unit disposed to cause a visual field of the first image capturing unit and a visual field of the second image capturing unit to overlap each other; a first enclosure that encloses the first image capturing unit and has a portion that is within the visual field of the first image capturing unit; and a second enclosure that encloses the second image capturing unit and has a portion that is within the visual field of the second image capturing unit. The vehicle-mounted stereo camera device according to the present disclosure further includes a controller that calculates a distance to a body outside the vehicle based on an image captured by the first image capturing unit, on an image captured by the second image capturing unit, and on positions of the first image capturing unit and the second image capturing unit on the vehicle.

Also, the controller detects a displacement amount of the first image capturing unit based on an amount of change in a position of the first enclosure within the visual field of the first image capturing unit, and then the controller changes a cutout position in the image captured by the first image capturing unit based on the displacement amount of the first image capturing unit. In addition, the controller detects a displacement amount of the second image capturing unit based on an amount of change in a position of the second enclosure within the visual field of the second image capturing unit, and then the controller changes a cutout position in the image captured by the second image capturing unit based on the displacement amount of the second image capturing unit.

The vehicle-mounted stereo camera device according to the present disclosure can achieve high-precision distance detection.

BRIEF DESCRIPTION OF DRAWINGS

FIG. 4 shows a schematic view illustrating the cross-sectional configuration from side of the vehicle-mounted stereo camera device according to the exemplary embodiment.

DETAILED DESCRIPTION

An exemplary embodiment will be described in detail below with reference to the drawings as appropriate. However, a description more detailed than necessary may be omitted. For example, a detailed description of already well-known matters and a repeated description regarding substantially identical components may be omitted. This is intended to avoid making the following description unnecessarily redundant and to make it easier for a person skilled in the art to understand the exemplary embodiment.

It is to be noted that the accompanying drawings and the following description are provided in order for a person skilled in the art to fully understand the present disclosure, and are not intended to limit the subject described in the appended claims.

The exemplary embodiment will be described below with reference to FIGS. 1 to 6.

Exemplary Embodiment

[Configuration of Vehicle-Mounted Stereo Camera Device]

Figure 1:
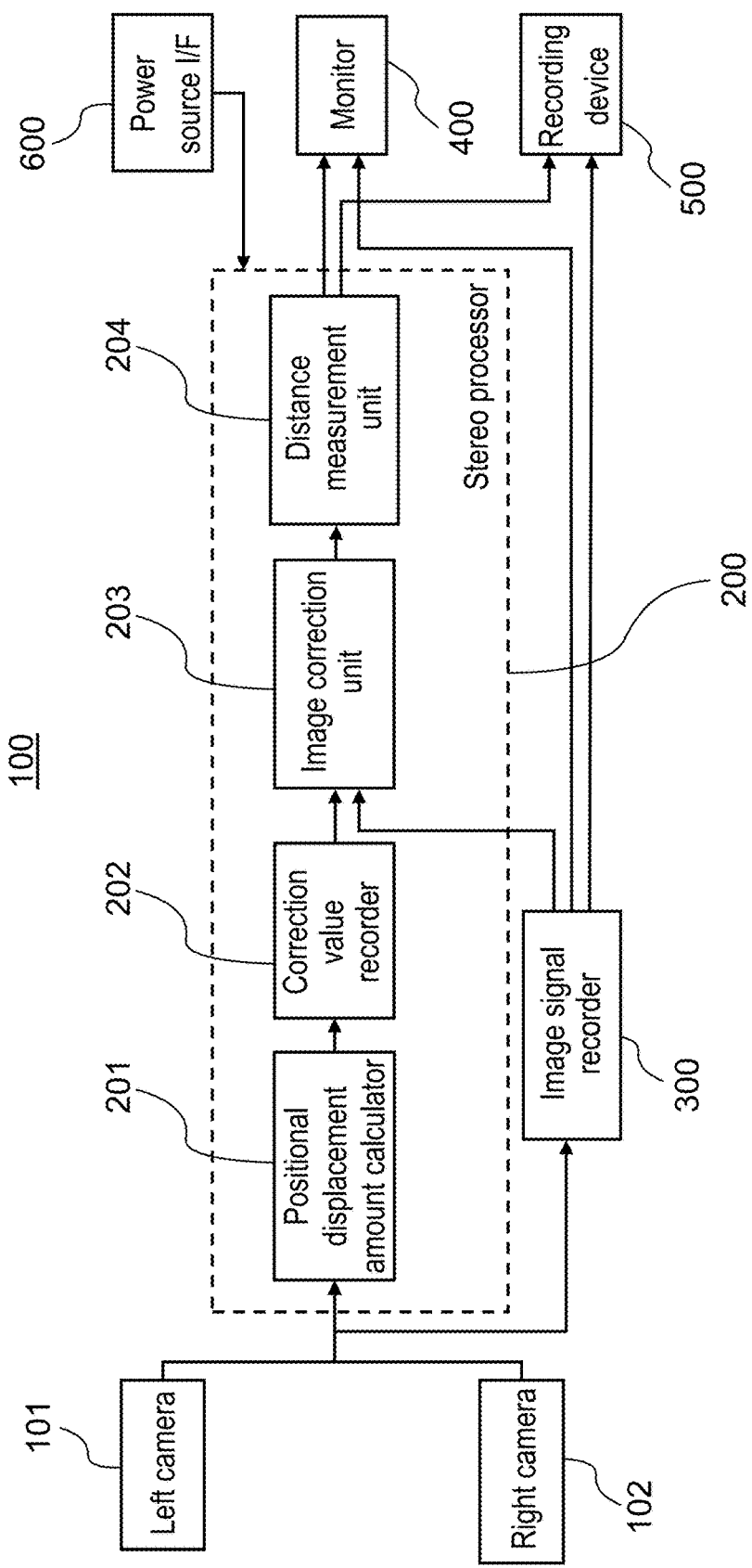
FIG. 1 is a block diagram illustrating a configuration of a vehicle-mounted stereo camera device according to the exemplary embodiment.

FIG. 1 is a block diagram illustrating a configuration of vehicle-mounted stereo camera device 100 according to the exemplary embodiment. In FIG. 1, vehicle-mounted stereo camera device 100 includes left camera (first image capturing unit) 101, right camera (second image capturing unit) 102, stereo processor (controller) 200, image signal recorder 300, monitor 400, recording device 500, and power source I/F 600.

Image signals captured by left camera 101 and right camera 102 are input into stereo processor 200 and image signal recorder 300. Stereo processor 200 determines parallax from a matching level of two images by using a technique of image matching. Stereo processor 200 calculates a distance to an object to be measured that exists outside a vehicle by a principle of triangulation based on the parallax and a distance between left camera 101 and right camera 102. The image signals captured by left camera 101 and right camera 102, and distance results calculated by stereo processor 200 are displayed on monitor 400 and are recorded in recording device 500. Power source I/F 600 supplies electricity from a cigarette lighter socket, a battery, or the like of the vehicle to each unit.

Stereo processor 200 includes positional displacement amount calculator 201 that detects physical displacement amounts of left camera 101 and right camera 102, correction value recorder 202 that records the positional displacement amount, image correction unit 203 that changes cutout positions of images captured by left camera 101 and right camera 102 based on the positional displacement amount, and distance measurement unit 204 that calculates the parallax from the cutout right and left images and converts the parallax into the distance to the object to be measured.

Figure 2:
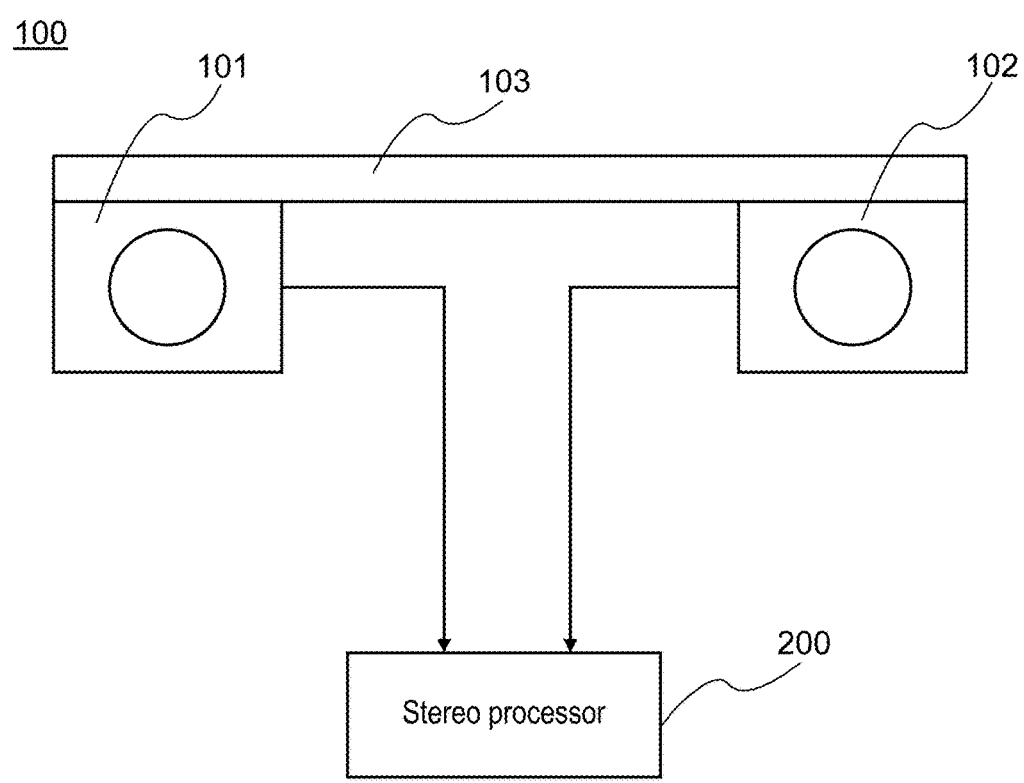
FIG. 2 is a schematic view illustrating the configuration of the vehicle-mounted stereo camera device according to the exemplary embodiment.

FIG. 2 is a schematic view illustrating the configuration of vehicle-mounted stereo camera device 100 according to the exemplary embodiment. In FIG. 2, left camera 101 and right camera 102 are mounted inside the vehicle at a distance of a base length away via holder 103 to cause visual fields to overlap each other. Left camera 101 and right camera 102 are adjusted during manufacturing to cause optical axes to become parallel with each other. Each of left camera 101 and right camera 102 includes an imaging element, a zoom lens, a focus lens, a fixed lens, and other elements.

Figure 3:
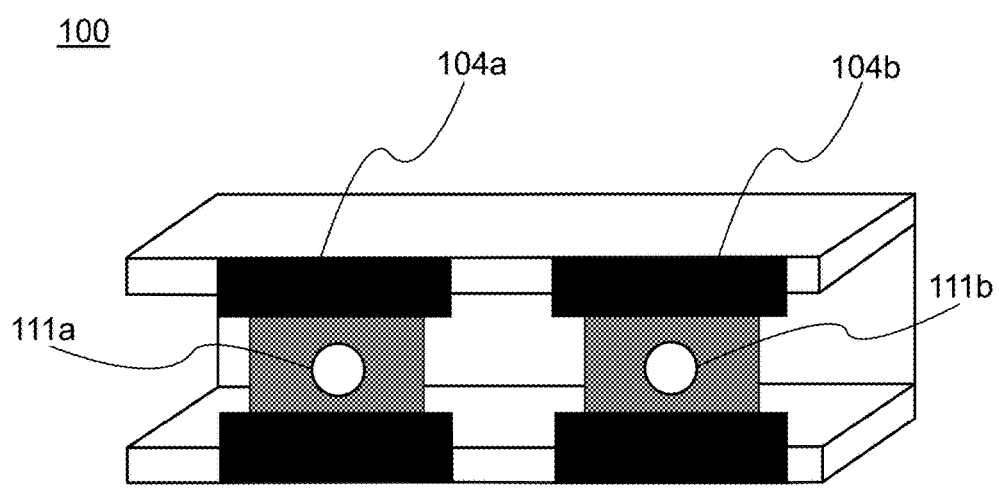
FIG. 3 is a schematic view illustrating the front configuration of the vehicle-mounted stereo camera device according to the exemplary embodiment.

FIG. 3 is a schematic view illustrating the front configuration of vehicle-mounted stereo camera device 100 according to the exemplary embodiment. As illustrated in FIG. 3, vehicle-mounted stereo camera device 100 includes first enclosure 104a that encloses surroundings of left camera 101 ahead of left camera 101 including left lens 111a. In addition, vehicle-mounted stereo camera device 100 includes second enclosure 104b that encloses surroundings of right camera 102 ahead of right camera 102 including right lens 111b. First enclosure 104a includes a portion that is within the visual field of left camera 101. Also, second enclosure 104b includes a portion that is within the visual field of right camera 102. It is to be noted that first enclosure 104a and second enclosure 104b also have a function to prevent a user from touching the cameras and disabling accurate distance measurement.

[Displacement Amount Detection Processing]

FIG. 4 shows a schematic view illustrating the cross-sectional configuration from side of the vehicle-mounted stereo camera device according to the exemplary embodiment. In FIG. 4, (a) illustrates disposition in an initial state and (b) illustrates a state in an aging state.

Left camera 101 and right camera 102 are mechanically adjusted to cause optical axes to become parallel with each other during an initial manufacturing stage. Nevertheless, however precisely initial adjustment may be performed, it is difficult to hold an initial value continuously.

For example, as illustrated in FIG. 4(a), in the initial state, right lens 111b is horizontally installed with respect to second enclosure 104b; however, when time elapses, as illustrated in FIG. 4(b), due to aging, right lens 111b cannot keep horizontal with respect to second enclosure 104b. In particular, for on-vehicle applications, influence of temperature change, vibration, and the like inside a vehicle is large and is likely to cause positional displacements of the cameras.

Therefore, vehicle-mounted stereo camera device 100 according to the present disclosure detects the displacement amounts of the cameras by using first enclosure 104a and second enclosure 104b which are configured to be reflected within capturing visual fields of left camera 101 and right camera 102, respectively. Vehicle-mounted stereo camera device 100 then changes the cutout positions in the images based on the detected displacement amounts. This correction method enables achievement of high-precision distance measurement without errors during the distance measurement.

In FIG. 4, for example, specifically, second enclosure 104b is provided with a light-shielding region with a length of H so as to be reflected within the capturing visual field at a position distance D distant from a front ball of right lens 111b. Stereo processor 200 checks whether the optical axis has changed using the amount of change in the position of the light-shielding region. Then, when the position of the light-shielding region changes, the positional displacement amount of the camera is detected based on the amount of change in the light-shielding region, enabling accurate distance measurement.

It is to be noted that since distance D and light-shielding section H are already known, how many degrees the camera has displaced in which direction can be detected easily from a video. Accordingly, even when the camera needs to be adjusted after installation for maintenance or the like, the adjustment can be performed easily.

[Image Cutout Position Change Processing]

Figure 5A:
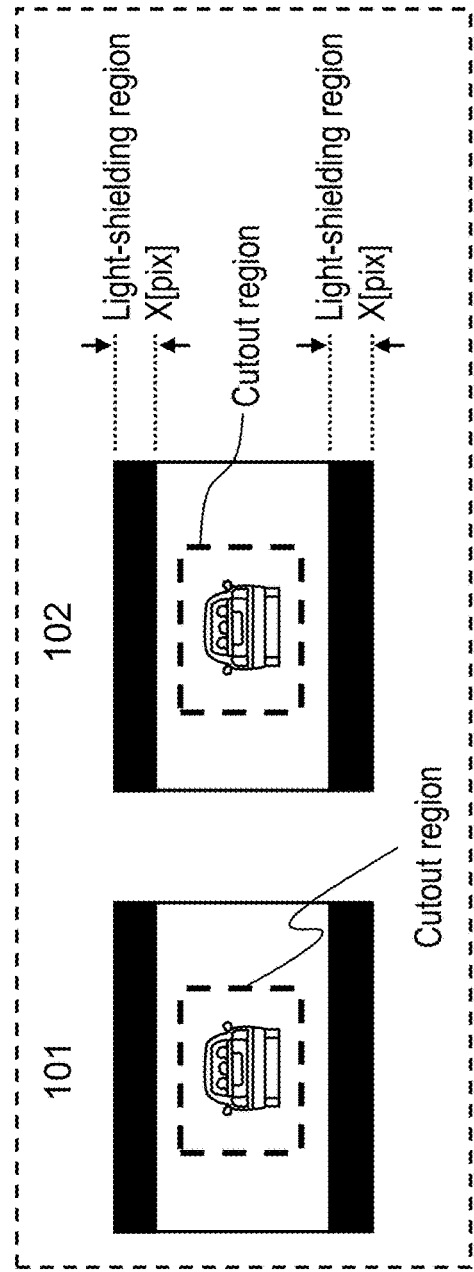
FIG. 5A is a diagram illustrating change processing of a cutout position according to the exemplary embodiment.
Figure 5B:
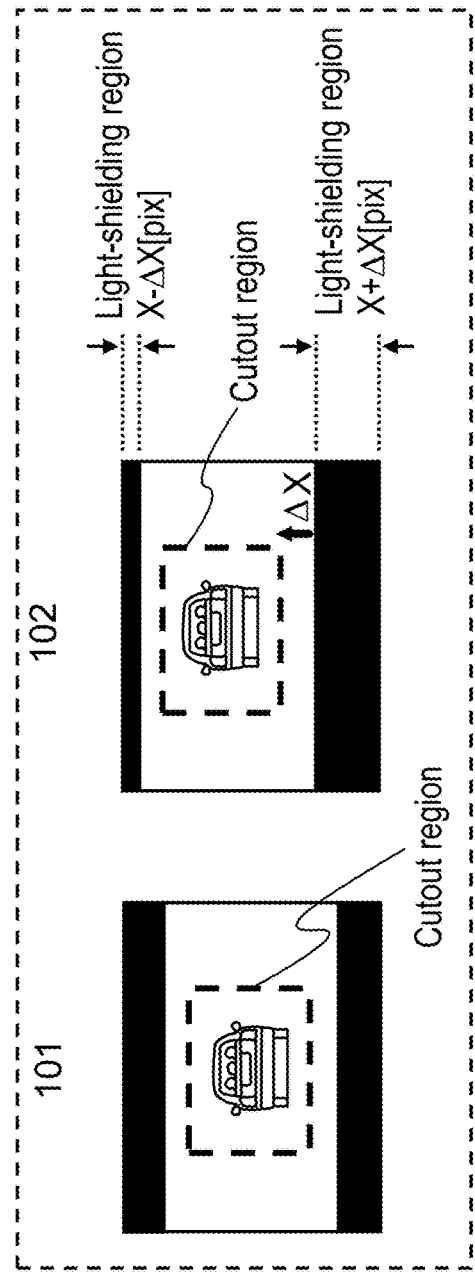
FIG. 5B is a diagram illustrating the change processing of the cutout position according to the exemplary embodiment.

FIG. 5A, FIG. 5B are diagrams illustrating change processing of the cutout position according to the exemplary embodiment. In other words, FIG. 5A, FIG. 5B are diagrams illustrating processing to be performed by image correction unit 203 by using the images in the initial state and the aging state acquired by left camera 101 and right camera 102. Here, description is provided of a case where the light-shielding regions are provided only in upper and lower portions of the image for purposes of simple description. A method for providing the light-shielding region is arbitrary.

As illustrated in FIG. 5A, in the initial state, since left camera 101 and right camera 102 are accurately adjusted in the manufacturing stage, the regions (number of pixels) shielded by first enclosure 104a and second enclosure 104b are identical between left camera 101 and right camera 102. In addition, in both left camera 101 and right camera 102, the upper and lower light-shielding regions (number of pixels) have an identical value. Here, the value is defined to be X [pix]. This X [pix] is stored in positional displacement amount calculator 201 in advance as an initial value.

In contrast, as illustrated in FIG. 5B, left camera 101 and right camera 102 are physically displaced in the aging state. These physical displacement amounts are calculated by utilizing the change in the regions (number of pixels) shielded by first enclosure 104a and second enclosure 104b. Here, consider an example in which only right camera 102 is displaced by ΔX [pix] in a lower direction with respect to a horizontal. In this case, of the regions (number of pixels) shielded by second enclosure 104b, the region (number of pixels) in an upper portion of the screen becomes small, X−ΔX [pix], whereas the region (number of pixels) in a lower portion of the screen becomes large, X+ΔX [pix]. This value of the region (number of pixels) in the upper portion of the screen: X−ΔX [pix] and the value of the region (number of pixels) in the lower portion of the screen: X+ΔX [pix] are stored in positional displacement amount calculator 201.

Among the image signals which are captured by left camera 101 and right camera 102 and recorded in image signal recorder 300, image correction unit 203 cuts out the image signal captured by displaced right camera 102 from a range in which the cutout position is displaced by X[pix] from the initial cutout position. Accordingly, distance measurement unit 204 receives the image of a range identical to a cutout range in the initial state, and performing image matching within the cutout range enables accurate distance measurement without any change from the initial state.

[Calibration Processing]

Figure 6:
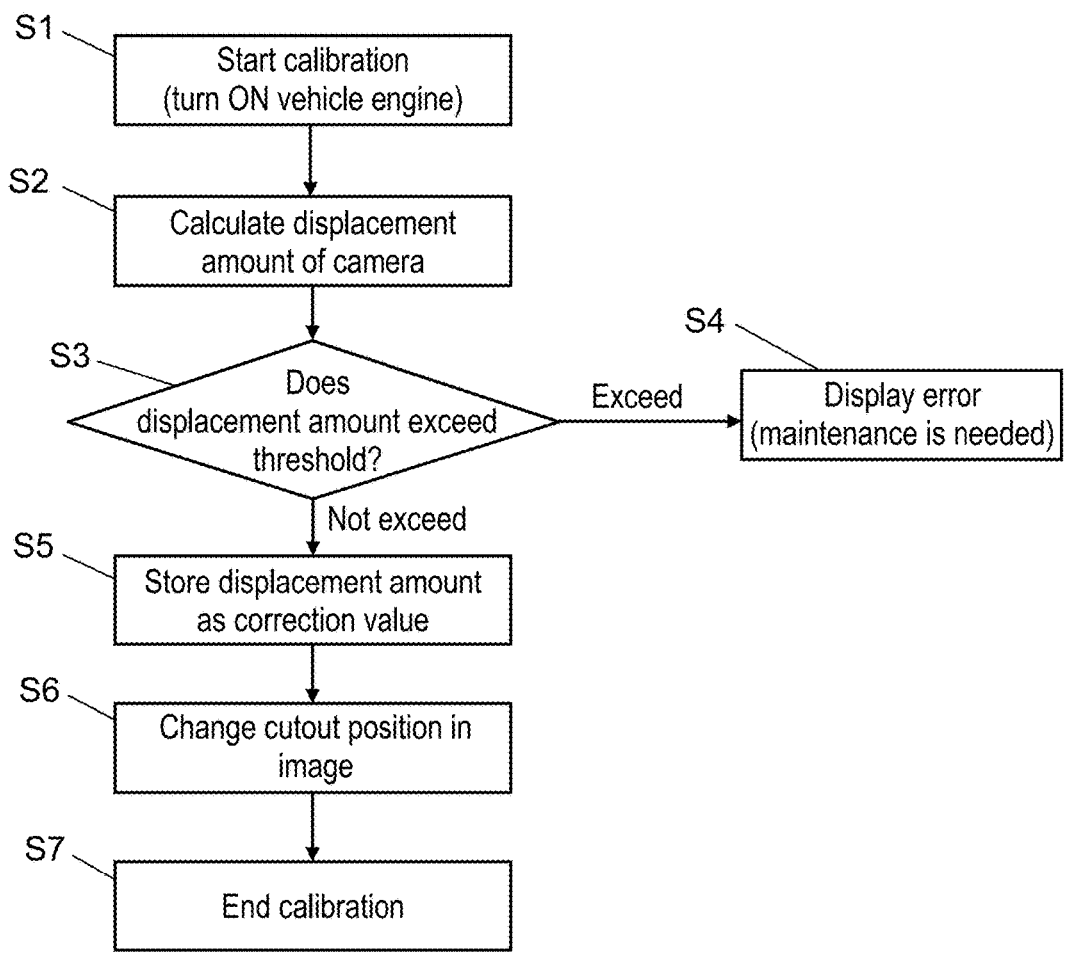
FIG. 6 is a flowchart illustrating calibration processing according to the exemplary embodiment.

FIG. 6 is a flowchart illustrating calibration processing of vehicle-mounted stereo camera device 100. In FIG. 6, when a driver starts an engine of a vehicle, image signals captured by left camera 101 and right camera 102 are input into stereo processor 200, and then calibration processing starts (S1). Positional displacement amount calculator 201 of stereo processor 200 calculates the physical displacement amounts of the cameras (S2). A certain threshold is provided in advance for the displacement amount calculated here, and stereo processor 200 determines whether at least one of the displacement amounts exceeds the threshold (S3). When the at least one of the displacement amounts exceeds the threshold, stereo processor 200 causes monitor 400 to display an error and notifies the driver that maintenance is needed (S4).

On the other hand, when none of the displacement amounts exceeds the threshold, stereo processor 200 stores the displacement amounts in correction value recorder 202 as correction values (S5). Image correction unit 203 then changes the cutout position by a number of pixels corresponding to each correction value in each image captured by each of left camera 101 and right camera 102 (S6). Distance measurement unit 204 receives the cutout right and left images to perform distance measurement. Thus, the calibration ends (S7). Performing this processing every time the user starts the engine of the vehicle always enables accurate distance measurement.

Other Exemplary Embodiments

As described above, the exemplary embodiment has been described as illustration of the technology to be disclosed in this application. The technology in the present disclosure, however, is not limited to this exemplary embodiment, and may be applied to exemplary embodiments to which changes, replacements, additions, and omissions have been made. It is also possible to make a new exemplary embodiment by combining components described in the aforementioned exemplary embodiment.

In [Calibration processing] of the exemplary embodiment, every time calculating the displacement amounts in S2, stereo processor 200 determines whether the displacement amounts exceed the threshold. However, it is also possible to record the displacement amounts multiple times and to determine whether the displacement amounts exceed the threshold by using an average of the displacement amounts or the like. It is also possible to change the cutout position based on the average of the displacement amounts recorded multiple times, or the like.

It is to be noted that since the aforementioned exemplary embodiment is intended to illustrate the technology in the present disclosure, various changes, replacements, additions, omissions, and the like may be made within the scope of the appended claims or equivalents thereof.

INDUSTRIAL APPLICABILITY

The present disclosure can be applied to the vehicle-mounted stereo camera device.

What is claimed is:

1. A vehicle-mounted stereo camera device comprising:
a first image capturing unit and a second image capturing unit disposed to cause a visual field of the first image capturing unit and a visual field of the second image capturing unit to overlap each other;
a first enclosure that encloses the first image capturing unit and has a portion that is within the visual field of the first image capturing unit;
a second enclosure that encloses the second image capturing unit and has a portion that is within the visual field of the second image capturing unit; and
a controller that calculates a distance to a body outside a vehicle based on an image captured by the first image capturing unit, on an image captured by the second image capturing unit, and on positions of the first image capturing unit and the second image capturing unit on the vehicle,
wherein the controller:
captures two first images using the first image capturing unit;
detects a first shielded region in each of the captured two first images, the first shielded region being shielded by the portion of the first enclosure;
detects a displacement amount of the first image capturing unit based on an amount of change in the first shielded region;
changes a cutout position in an image captured by the first image capturing unit based on the detected displacement amount of the first image capturing unit;
captures two second images using the second image capturing unit;
detects a second shielded region in each of the captured two second images, the second shielded region being shielded by the portion of the second enclosure;
detects a displacement amount of the second image capturing unit based on an amount of change in the second shielded region; and
changes a cutout position in an image captured by the second image capturing unit based on the detected displacement amount of the second image capturing unit.

2. The vehicle-mounted stereo camera device according to claim 1, wherein the controller:
calculates and stores the displacement amounts every time electric power is supplied to the vehicle;
calculates an average of the displacement amounts when a number of times of the electric power supply reaches a predetermined number; and
changes the cutout positions based on the average of the displacement amounts.

3. A correction method of a vehicle-mounted stereo camera device comprising enclosure that encloses image capturing units and has portions that are within visual fields of the image capturing units,
the correction method comprising:
capturing two images using each of the image capturing units;
for each of the image capturing units, detecting shielded regions in each of the captured two images, the shielded regions being shielded by the portions of the enclosure;
detecting a displacement amount of at least one of the image capturing units based on an amount of change in the shielded regions; and
changing a cutout position in an image captured by at least one of the image capturing units of which the displacement amount is detected based on the detected displacement amount.

4. The correction method of a vehicle-mounted stereo camera device according to claim 3, the correction method further comprising:
calculating and storing the displacement amounts every time electric power is supplied to a vehicle;
calculating an average of the displacement amounts when a number of times of the electric power supply reaches a predetermined number; and
changing the cutout positions based on the average of the displacement amounts.

* * * * *